324-77
SEARCH ROOM
May 4, 1965 H. B. ANDREW 3,182,256
WAVE ANALYSIS SYSTEM UTILIZING TIME REVERSAL
Filed Oct. 8, 1962
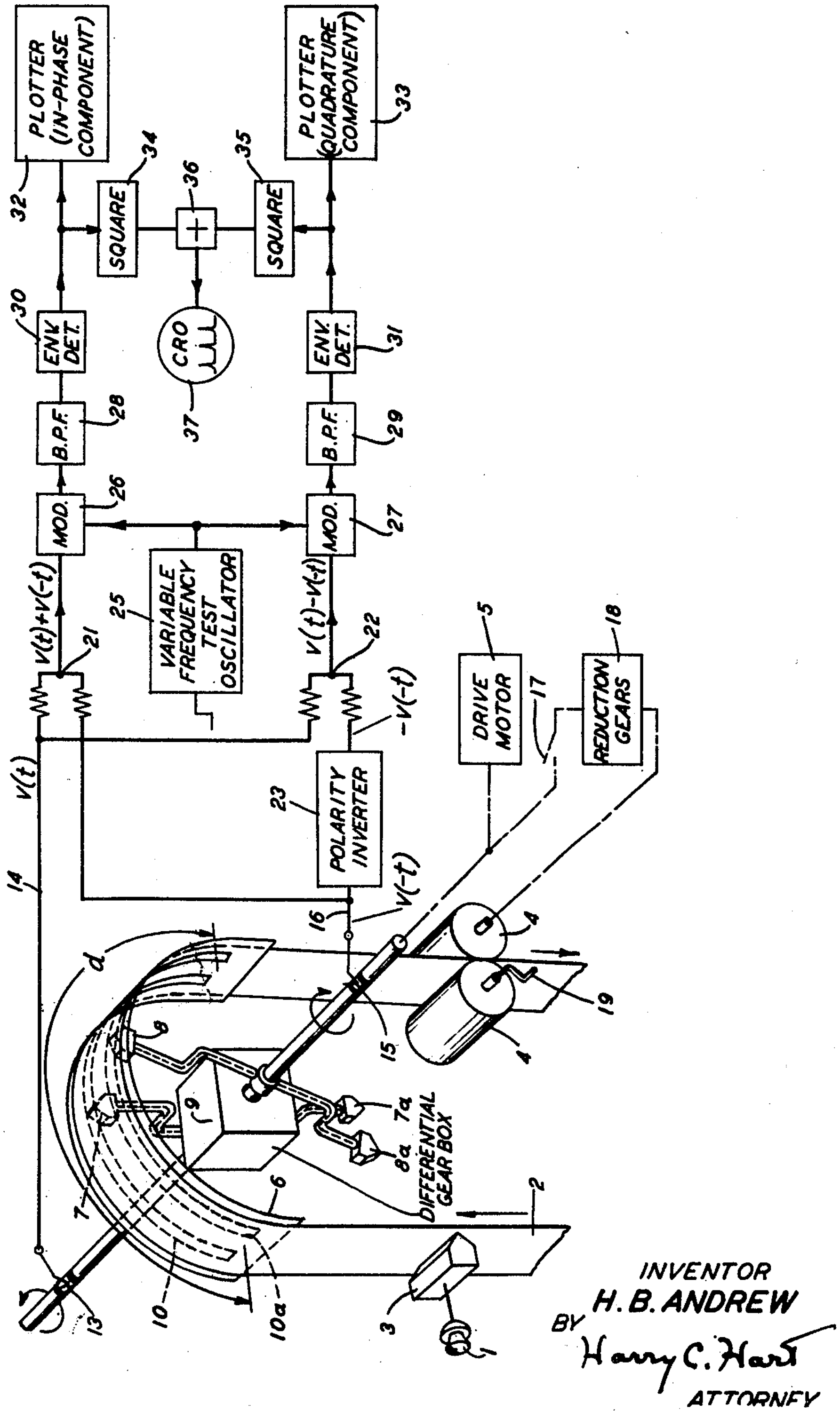
INVENTOR
H. B. ANDREW
BY Harry C. Hart
ATTORNEY

United States Patent Office 3,182,256
Patented May 4, 1965

3,182,256
WAVE ANALYSIS SYSTEM UTILIZING TIME REVERSAL

Harold B. Andrew, Chatham, N.J., assignor to Bell Telephone Laboratories, Incorporated, New York, N.Y., a corporation of New York Filed Oct. 8, 1962, Ser. No. 229,233
4 Claims. (Cl. 324—77)

This invention deals with the analysis of a complex wave. It has for a major object to develop, and to provide individual indications of, the coefficients of the cosine terms and of the sine terms of the Fourier series expansion of the wave.

The spectral analysis of message waves has in the past proceeded along one or other of two different avenues of approach. According to the first approach, resolution—that is to say, the selection of each individual frequency component independently of the others—is accomplished as by a sieve. As shown, for example, in FIG. 1 of R. K. Potter Patent No. 2,492,062, the message wave to be analyzed may be applied, simultaneously and in parallel, to a bank of filters having contiguous passbands. The energy then passing through each filter provides an indication of the energies of those components of the message wave that fall within the passband of that filter. Instead, and at the price of making a space record of the message wave and reproducing it repeatedly, the complexity of the apparatus may be reduced with the aid of heterodyne techniques and a sweep frequency oscillator. The energies within the constituent subbands of the message wave may then be determined seriatim with the aid of a single filter. Such a system is illustrated in FIG. 2 of the same Potter patent. Considerations of selectivity and resolution require that the passbands of the filters of the bank, or of the single analyzer filter, as the case may be, be narrow, in which case their responses are slow. For contemporaneous analysis it is imperative that the response of the filter be rapid, in which case its bandwidth tends to be so broad that resolution among components is lost. The design of the resolving filter thus requires a compromise between incompatible considerations.

A different approach, which more nearly follows that of Fourier's theorem, turns to account the principles of orthogonality and orthonormality that hold among sinusoidal waves of different frequencies. Analysis by this approach is instrumented by the provision of a two-phase source of a sinusoidal test wave of controllable frequency; that is to say, one which at each frequency delivers, at two different output points, two sinusoidal waves that are in time quadrature; i.e., if one is a cosine wave, the other is a sine wave. By independently modulating each of these test waves with the entire message wave and selecting certain modulation products to the exclusion of others, it is possible to develop, for a particular frequency, simultaneous indications of the in-phase components of the message wave and of its quadrature components. Such a system is instrumented in Losher Patent No. 3,045,180. But to secure the required exact time quadrature relation between the two outputs of the test wave generator and to hold it over a suitable wide range of frequencies is not easy. Moreover, in the absence of exact synchronism between the test wave and the message wave and a knowledge of the phase relation that holds between them, these indications are inclined to fluctuate. In the case of principal interest, namely, that in which the message wave to be analyzed is only quasi-periodic, synchronization between the message wave and the test wave is, at best, difficult and approximate. At worst, it is impossible.

The present invention, while it resembles analyzers of the second class in the employment of a test wave oscillator, dispenses entirely with the requirement that it furnish two different outputs at the same frequency and in time quadrature. Instead, and by resort to time-reversal techniques, it substitutes for the original message wave two derived waves of which one is an even function—the series representation of it contains only cosine terms—while the other is an odd function—its series contains only sine terms. The even function wave is the sum of the original wave and its time-reversed counterpart while the odd function wave is their difference. These substitute waves are now individually modulated, in two distinct paths, by a sinusoidal test wave of appropriate frequency. Of the modulation products, a single one is selected in each case through the agency of a filter which, since it is not relied upon for analysis but only for selection among the products of analysis, need not have an excessively narrow passband. Hence, its response to a change of conditions can be comparatively rapid. Which one of the modulation products is selected is governed largely by ease of instrumentation. Once the selection has been made, the selected modulation product is rectified, or detected, to provide the desired indication. Because no sine components are present in the even function or sum wave, the selected modulation product developed from this wave is representative of a coefficient of a term of the cosine series; i.e., of the magnitude of the in-phase component of the original wave at a particular frequency. Similarly, because no cosine components are present in the odd function or difference wave, the modulation product developed from it provides an indication of the coefficient, for the same frequency, of a term of the sine series; i.e., of the magnitude of the quadrature component of the original wave.

If the power density spectrum alone is of interest, these two indications can be individually squared and their squares added together to provide a single indication which is now representative of the energy of the message wave at the particular frequency. If, instead, individual indications are required of the amplitudes of the in-phase component and of the quadrature component, respectively, they are available. While, for imperfect synchronism between the test wave and the message wave or its reproduced counterpart these indications may fluctuate, they may be individually plotted as time progresses; and from these plots, one of the fluctuations of the in-phase component and the other of the quadrature component, much information as to the constitution of the message wave, not derivable from the power density spectrum, can be obtained.

The invention will be readily apprehended from the following detailed description of an illustrative embodiment thereof taken in connection with the appended drawing which is a diagram, partly in block schematic form, of apparatus embodying the invention.

Referring now to the drawing, a wave to be analyzed, illustratively a voice wave originating in a microphone 1, is recorded on a suitable medium such as a magnetic tape 2 by a transducer or recording head 3 of known construction past which the tape is advanced, e.g., by driving rollers 4, at a suitable slow speed under control of a motor 5. Disposed beyond the recording head is an arcuate track or guide 6 over which the tape 2 travels. This track determines the geometrical length *d* of a tape segment to be reproduced and hence the duration T of that part of the original wave which is recorded on the segment *d*.

The wave recorded on this segment is reproduced by pickup heads which are driven in opposite directions by the drive motor 5. Thus, a first head 7 is driven through a differential gear box 9 in a counterclockwise direction while a second head 8 is driven directly in a clockwise direction. A differential gear arrangement of which the axis of the idler gear, not shown, is fixed to the frame, assures that the movements of the heads 7, 8 shall be in opposite directions, at the same speeds, and with an unvarying phase relation. The track 6 is provided with two slots 10, 10*a* through the first of which the first pickup head 7 senses the record on the tape 2 while the second head 8 senses the same record through the second slot 10*a*.

To simplify the operation of driving the tape, the guiding track 6 is here shown as extending through 180° or a semicircle. Accordingly, the first reproducer comprises two scanning heads 7, 7*a* disposed at opposite ends of a supporting arm so that the second head enters upon the record segment as the first one leaves it, thus to scan the segment and develop a time variant counterpart of the recorded message wave segment without gaps. The same is true of the second reproducer, which is constituted of pickup heads 8, 8*a*. The wave output of the first reproducer is withdrawn through a slip ring 13 and appears on an upper conductor 14. Similarly, the wave output of the second reproducer is withdrawn through a slip ring 15 and appears on a lower output conductor 16.

Reproduction may take place while the tape 2 is being slowly advanced from end to end of the guiding track 6, in which case the tape drive is coupled to the reproducer drive through a clutch 17, symbolically shown as a mechanical switch, and reduction gears 18. For many purposes it may be desirable, once the record has been made, to leave it in a fixed position on the guide 6 while reproducing it repeatedly. To leave it fixed, it is only necessary to disengage the clutch 17, i.e., to open the switch. The position in which the tape is left, and thus the identity of the segment scanned, may be manually controlled, as by a crank 19.

In order that the two reproducers, disposed in planes such that they may pass by each other without interference, shall nevertheless pick up the same signals, the tape 2 itself and the recording head 3 are of generous widths, i.e., somewhat more than twice as wide as any of the pickup heads 7 . . . 8*a*.

Alternatively, two distinct records of the message wave may be made independently, and individually scanned, one reproducer traveling in the direction of movement of the record while the other travels in the opposite direction.

Given a segment of tape 2 bearing a record of a message wave $v_1(t)$ of duration T, and of which the steady component or average value is zero, and given that it is repeatedly reproduced, it may be represented by a Fourier series of the form $$v_1(t)=\sum_1^N a_n \cos 2\pi nt/T+\sum_1^N b_n \sin 2\pi nt/T \quad (1)$$

where $$a_n=\frac{2}{T}\int_{-T/2}^{T/2} v_1(t) \cos \frac{2\pi nt}{T}dt$$

$$b_n=\frac{2}{T}\int_{-T/2}^{T/2} v_1(t) \sin \frac{2\pi nt}{T}dt$$

and the subscript $n$ takes on all integral values.

As a practical matter and to economize time, the reproduction may take place at much higher speed than the original recording operation, i.e., each reproduction of the segment of length T may take place in a shorter time $\tau$. If $$m=T/\tau$$

then $m$ is a time compression or frequency multiplication factor. When this is taken into account, the Fourier series representation of the wave thus reproduced is given by $$v(t)=\sum_1^N a_n \cos 2\pi mnt/T+\sum_1^N b_n \sin 2\pi mnt/T \quad (2)$$

It is well known that, in the case of any Fourier series expansion of the form of Equation 2, the first of the two series is an even function while the second is an odd function. That is to say, if the sign of the argument, in this case time, be reversed, the Fourier series expansion of the time-reversed counterpart wave is given by $$v(-t)=\sum_1^N a_n \cos 2\pi mnt/T-\sum_1^N b_n \sin 2\pi mnt/T \quad (3)$$

Hence, by addition, $$v(t)+v(-t)=2\sum_1^N a_n \cos 2\pi mnt/T \quad (4)$$

while, by subtraction, $$v(t)-v(-t)=2\sum_1^N b_n \sin 2\pi mnt/T \quad (5)$$

The invention turns these relations to account in the following fashion. Given that the upper output conductor 14 carries the repeatedly reproduced wave $v(t)$ in the natural time progression, the lower output conductor 16 carries its time-reversed counterpart $v(-t)$. These two waves are additively combined, through padding resistors, at a first combining point 21 to develop a sum wave $v(t)+v(-t)$. In addition, they are subtractively combined to develop a difference wave $v(t)-v(-t)$ at a second combining point 22. The subtraction may be carried out in any desired fashion. For ease of description the incoming time-reversed wave $v(-t)$ is converted by a polarity inverter 23 to its negative counterpart $-v(-t)$ and this is additively, combined at the second combining point 22. The polarity inverter 23 may be a conventional triode "amplifier" stabilized, as by employment of negative feedback, to provide a gain of unity.

In accordance with the invention the output of a variable frequency oscillator 25 is employed to modulate both the sum wave and the difference wave. To this end the sum wave is applied to the first input terminal of a first modulator 26 while the difference wave is applied to the first input terminal of a second modulator 27 and the output of the variable frequency oscillator 25 is applied in common to the second input terminals of the two modulators 26, 27. The oscillator 25 is constructed to deliver a pure sinusoidal wave of frequency that is controllable through a range of extent equal to the extent of the frequency range of the wave $v(t)$. Advantageously, this range of frequencies is located at a different part of the frequency scale, e.g., higher. Of the two sets of modulation products formed by the first modulator 26, one set has frequencies equal to the sums of the frequency of the output of the test oscillator 25 and the frequencies of the several components of the sum wave, the other set has frequencies equal to the differences of the frequency of the test oscillator 25 and the frequencies of the several components of the sum wave. A bandpass filter 28 of fixed midband frequency selects a single one of these modulation products. This is therefore representative of the magnitude of a particular frequency component of the input sum wave and the identity of this component shifts from term to term of the series as the frequency of the test oscillator 25 is altered. The action of the bandpass filter 29 in the lower path is identical. In each case the modulation product selected by the bandpass filter is applied to a detector 30, 31 which recovers its envelope. The detected envelope in the upper path is applied to a first plotter 32 and the detected envelope in the lower path is applied to a second plotter 33.

As shown by Equations 4 and 5, the sum wave in the upper path is devoid of sine terms while the difference wave in the lower path is devoid of cosine terms. For this reason the modulation of the sum wave by the sinusoidal output of the test oscillator 25, at any suitable frequency and at random phase, is uninfluenced by any of the sine terms of the original Fourier series. Similarly, the modulation products in the lower path are uninfluenced by any of the cosine terms of the original series. Hence the signal recovered from the upper detector 30 is representative, apart from sign, of a cosine term while the signal recovered from the lower detector 31 is similarly representative, apart from sign, of a sine term. Thus, for any particular setting of the frequency of the test oscillator 25, the signal applied to the upper plotter 32 represents the fluctuations, as the tape 2 is advanced, of the in-phase component of the original wave for a related frequency; i.e., it represents $a_n$. Similarly, the signal applied to the lower plotter 33 represents the quadrature component of the original wave at the same frequency, designated in the series by the coefficient $b_n$.

It is a characteristic of a Fourier series expansion of any wave that the magnitudes of the coefficients of the cosine and of the sine series are dependent on the points of the original message wave at which the segment of length T being reproduced commences and terminates. Hence, under some conditions it may be desirable that the tape record not be continuously advanced while the reproduction is in progress but rather that it be manually moved, forward or backward, by small amounts, e.g., until either the in-phase component for a particular frequency, $a_n$, reaches a maximum or until some other normalizing condition is attained. The frequency of the test oscillator 25 can then be altered to examine, with the aid of the plotter, the magnitudes of the coefficients of the in-phase components at successively higher frequencies. Each of these can then be compared, to suit the analyst's needs, with the quadrature component at the same frequency or at a different frequency.

In this way independent indications are realized of the magnitudes of the coefficients of the in-phase components and of the quadrature components of the original message wave and the fact that they are momentarily dependent on the exact instant of commencement and termination of the recorded segment of length T is overcome.

If, to the contrary, interest is restricted to the power spectrum of the message wave without regard to the phase relations among its several components, the outputs of the two detectors may be individually squared by devices 34, 35 having square law input-output characteristics; the two squared envelopes may be combined by an adder 36, and their sum applied to an indicator such as a cathode ray oscilloscope 37. While the coefficients of the individual cosine series and sine series are dependent on the instant of commencement and termination of the recorded segment of length T, the sums of their squares are independent of these instants. Hence, the power spectrum representation on the screen of the oscilloscope 37 can be advantageously examined while an incoming message wave is being continuously recorded on the tape and the latter is being continuously advanced over the guide by the drive rollers, the clutch being engaged.

While a specific embodiment of this invention has been described, other embodiments of said invention will be obvious to those skilled in the art.

What is claimed is:

1. Apparatus for analyzing a complex periodic wave to develop individual indications of the coefficients of the cosine terms and of the sine terms of its Fourier series expansion which comprises means for making a space-variant record of said wave,
means for scanning said record in one direction to develop a forward time wave $v(t)$,
means for scanning said record in the opposite direction to develop a reverse time wave $v(-t)$,
means for additively and subtractively combining said waves to form a sum wave $v(t)+v(-t)$ and a difference wave $v(t)-v(-t)$,
an auxiliary, single-phase source of variable frequency oscillations,
means for individually modulating said sum wave and said difference wave by the oscillations of said auxiliary source to develop a first and a second product wave,
filter means for individually selecting, from among the components of said first and second product waves, only those that lie within a specified frequency band,
and means for indicating the magnitudes of said selected components individually,
whereby, for each distinct frequency of said auxiliary oscillations, the amplitudes of said selected components are proportional, respectively, to the desired cosine term coefficient and the desired sine term coefficient of said complex wave for a corresponding frequency.

2. Apparatus for analyzing a complex periodic wave $v(t)$ to develop individual indications of the coefficients of the cosine terms and of the sine terms of its Fourier series expansion which comprises record-reproduce means for developing a reverse time wave $v(-t)$,
means for additively and subtractively combining said waves to form a sum wave $v(t)+v(-t)$ and a difference wave $v(t)-v(-t)$,
an auxiliary, single-phase source of variable frequency oscillations,
means for individually modulating said sub wave and said difference wave by the oscillations of said auxiliary source to develop a first and a second product wave,
and filter means for individually selecting, from among the components of said first and second product waves, only those that lie within a specified frequency band,
whereby, for each distinct frequency of said auxiliary oscillations, said selected components are proportional, respectively, to the desired cosine term coefficient and the desired sine term coefficient of said complex wave for a corresponding frequency.

3. Apparatus for analyzing a complex periodic wave $v(t)$ to develop individual indications of the coefficients of the cosine terms and of the sine terms of its Fourier series expansion which comprises record-reproduce means for developing a reverse time wave $v(-t)$,
means for additively and subtractively combining said waves to form a sum wave $v(t)+v(-t)$ of which the Fourier series expansion contains only cosine terms and a difference wave $v(t)-v(-t)$ of which the Fourier series expansion contains only sine terms,
an auxiliary, single-phase source of variable frequency oscillations,
means for individually modulating said sum wave and said difference wave by the oscillations of said auxiliary source to develop a first and a second product wave,
and filter means for individually selecting, from among the components of said first and second product waves, only those that lie within a specified frequency band,
whereby, for each distinct frequency of said auxiliary oscillations, the components selected from the first product wave are uninfluenced by quadrature components of the original wave, while the components selected from the second product wave are uninfluenced by in-phase components of the original wave.

4. Apparatus to determine the coefficients of the sine and cosine terms of the Fourier series representation of a complex periodic wave that is resolvable into the sum of two waves, of which one is an even function wave while the other is an odd function wave which comprises means for directing said complex wave simultaneously into two distinct paths, a first path and a second path, means in the first path for nullifying the odd function wave,
means in the second path for nullifying the even function wave,
an auxiliary, single-phase source of variable frequency oscillations,
means in the first path for modulating the nonnullified even function wave by the oscillations of said auxiliary source to develop a first product wave,
means in the second path for modulating the nonnullified odd function wave by the oscillations of said auxiliary source to develop a second product wave,
filter means in the first path for individually selecting, from among the components of said first product wave, only those components that lie within a specified frequency band, and filter means in the second path for individually selecting from among the components of said second product wave, only those components that lie within said specified frequency band,
whereby, for each distinct frequency of said auxiliary oscillations, the amplitudes of said selected components are proportional, respectively, to the coefficient of the in-phase component and the coefficient of the quadrature component of said complex wave for a corresponding frequency.

References Cited by the Examiner

UNITED STATES PATENTS

| | | | |
|---|---|---|---|
| 2,522,369 | 9/50 | Guanella | 324—77 |
| 2,657,276 | 10/53 | Eliot et al. | 340—15.5 |
| 2,752,092 | 6/56 | McDonal. | |
| 2,872,996 | 2/59 | Runge | 340—15.5 X |
| 3,045,180 | 7/62 | Losher | 324—77 |
| 3,054,053 | 9/62 | Cook | 324—77 |

WALTER L. CARLSON, *Primary Examiner.*